(12) United States Patent
Campbell et al.

(10) Patent No.: US 7,636,888 B2
(45) Date of Patent: Dec. 22, 2009

(54) VERIFYING COMPATIBILITY BETWEEN DOCUMENT FEATURES AND SERVER CAPABILITIES

(75) Inventors: John S. Campbell, Redmond, WA (US); Eran Megiddo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 11/081,262

(22) Filed: Mar. 15, 2005

(65) Prior Publication Data

US 2006/0212814 A1 Sep. 21, 2006

(51) Int. Cl.
*G06F 3/00* (2006.01)

(52) U.S. Cl. .................. 715/708; 715/705; 715/712; 715/714

(58) Field of Classification Search .................. 714/38, 714/48; 715/705, 708, 712, 714, 733, 748, 715/764
See application file for complete search history.

(56) References Cited

U.S. PATENT DOCUMENTS

| | | | | |
|---|---|---|---|---|
| 5,485,617 A * | 1/1996 | Stutz et al. | ................... | 719/315 |
| 5,511,197 A * | 4/1996 | Hill et al. | ..................... | 719/328 |
| 5,517,645 A * | 5/1996 | Stutz et al. | ................... | 719/316 |
| 5,539,877 A * | 7/1996 | Winokur et al. | ............... | 714/26 |
| 5,581,760 A * | 12/1996 | Atkinson et al. | ............ | 717/108 |
| 5,600,833 A * | 2/1997 | Senn et al. | ...................... | 707/1 |
| 5,682,536 A * | 10/1997 | Atkinson et al. | ............ | 717/165 |
| 5,689,703 A * | 11/1997 | Atkinson et al. | ......... | 707/103 R |
| 5,692,157 A * | 11/1997 | Williams | ..................... | 709/246 |
| 5,710,925 A * | 1/1998 | Leach et al. | ................. | 719/316 |
| 5,724,588 A * | 3/1998 | Hill et al. | .................... | 719/328 |
| 5,740,439 A * | 4/1998 | Atkinson et al. | ............ | 719/320 |
| 5,745,764 A * | 4/1998 | Leach et al. | ................. | 719/316 |
| 5,745,767 A * | 4/1998 | Rosen et al. | ................. | 717/124 |
| 5,794,038 A * | 8/1998 | Stutz et al. | ................... | 719/315 |
| 5,802,380 A * | 9/1998 | Bangs et al. | ................. | 715/235 |
| 5,805,885 A * | 9/1998 | Leach et al. | ................. | 719/316 |
| 5,842,018 A * | 11/1998 | Atkinson et al. | ............ | 715/209 |
| 5,844,554 A * | 12/1998 | Geller et al. | ................. | 715/744 |
| 5,905,884 A * | 5/1999 | Williams | ..................... | 709/227 |
| 5,963,641 A * | 10/1999 | Crandall et al. | ................ | 380/2 |
| 5,964,875 A * | 10/1999 | Autor et al. | ................. | 713/100 |
| 6,115,544 A * | 9/2000 | Mueller | ........................ | 714/57 |
| 6,240,465 B1 * | 5/2001 | Leach et al. | ................. | 719/316 |
| 6,243,764 B1 * | 6/2001 | Leach et al. | ................. | 719/316 |
| 6,263,379 B1 * | 7/2001 | Atkinson et al. | ............ | 719/332 |
| 6,324,498 B1 * | 11/2001 | Wajda | ......................... | 703/25 |
| 6,353,452 B1 * | 3/2002 | Hamada et al. | ............. | 715/825 |
| 6,412,020 B1 * | 6/2002 | Leach et al. | ................. | 719/316 |
| 6,414,697 B1 * | 7/2002 | Amro et al. | ................. | 715/772 |
| 6,437,805 B1 * | 8/2002 | Sojoodi et al. | ............. | 715/763 |
| 6,499,036 B1 * | 12/2002 | Gurevich | ................ | 707/103 R |
| 6,519,764 B1 * | 2/2003 | Atkinson et al. | ............ | 717/120 |

(Continued)

*Primary Examiner*—Weilun Lo
*Assistant Examiner*—Eric Wiener
(74) *Attorney, Agent, or Firm*—Merchant & Gould P.C.

(57) ABSTRACT

Methods, systems, and computer program products verify compatibility between a document to be published for access via a server and capabilities of the server to support features of the document. A method involves receiving a document, scanning the document for features, comparing the features to the capabilities of the server, and determining whether the capabilities of the server support the features of the document. The method also involves generating an incompatibility notice for a feature of the document when the feature is not supported by the capabilities of the server.

13 Claims, 9 Drawing Sheets

U.S. PATENT DOCUMENTS

| | | | |
|---|---|---|---|
| 6,526,454 B2* | 2/2003 | Williams et al. | 719/315 |
| 6,615,231 B1* | 9/2003 | Deen et al. | 709/201 |
| 6,647,517 B1* | 11/2003 | Dickey et al. | 714/48 |
| 6,816,984 B1* | 11/2004 | Snyder et al. | 714/38 |
| 6,906,721 B1* | 6/2005 | Burrell | 345/581 |
| 6,927,770 B2* | 8/2005 | Ording | 345/440 |
| 6,971,093 B1* | 11/2005 | Spring | 717/170 |
| RE39,285 E * | 9/2006 | Stutz et al. | 719/315 |
| 7,150,024 B2* | 12/2006 | Atkinson et al. | 719/316 |
| 7,200,779 B1* | 4/2007 | Coss et al. | 714/48 |
| 7,284,190 B2* | 10/2007 | Chellis et al. | 715/229 |
| 7,441,253 B2* | 10/2008 | Atkinson et al. | 719/331 |
| 2001/0013043 A1* | 8/2001 | Wagner | 707/511 |
| 2002/0040410 A1* | 4/2002 | Leach et al. | 709/315 |
| 2002/0120693 A1* | 8/2002 | Rudd et al. | 709/206 |
| 2002/0196285 A1* | 12/2002 | Sojoodi et al. | 345/771 |
| 2003/0093551 A1* | 5/2003 | Taylor et al. | 709/237 |
| 2003/0200504 A1* | 10/2003 | Atkinson et al. | 715/500 |
| 2004/0236781 A1* | 11/2004 | Williams | 707/102 |
| 2005/0198336 A1* | 9/2005 | Eytchison et al. | 709/230 |
| 2005/0259656 A1* | 11/2005 | Dollar et al. | 370/392 |
| 2006/0178902 A1* | 8/2006 | Vicars et al. | 705/1 |
| 2007/0061816 A1* | 3/2007 | Atkinson et al. | 719/316 |
| 2007/0061817 A1* | 3/2007 | Atkinson et al. | 719/316 |

* cited by examiner

VERIFYING COMPATIBILITY BETWEEN DOCUMENT FEATURES AND SERVER CAPABILITIES

COPYRIGHT NOTICE

A portion of the disclosure of this patent document contains material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention generally relates client and server document compatibility, and more particularly, is related to methods, systems and computer program products for verifying compatibility between a document to be published for access via a server and capabilities of the server to support features of the document.

BACKGROUND

Users of authoring applications author workbooks, developer solutions, and other documents using a client authoring application, such as EXCEL, a spreadsheet application from MICROSOFT Corporation of Redmond, Wash. An authored document produced by a client application may contain features such as connections to external data sources, query tables, as well as charts. After working on the document, the user may desire to publish the finished document to other members of a group. In order to publish the document, the document will be saved to a document server, for example an EXCEL Server, so that other people can view the document from the server.

However, there may be cases where not all of the functionality present in the client application to support features of the document will exist on the server. Document features that work in the client application may not actually work on the server or the server may have limited functionality that is a subset of what the client application can provide. In these cases, missing functionality and other problems with executing the document on the server may go undetected without alerting the end user in a timely fashion so corrective action can be taken.

Accordingly there is an unaddressed need in the industry to address the aforementioned deficiencies and inadequacies.

SUMMARY

Embodiments of the present invention provide methods, systems, and computer program products for verifying or checking compatibility between a document to be accessed via a server and capabilities of the server to support features of the document. Embodiments of the present invention may be executed on the server to compare features or functionality in the document, for example a workbook from a spreadsheet application, with supported functionality or features on a server to which the document will be published for others to view. The results of this comparison may be made known to a client application used in authoring the document in order to inform a user of the client application via a user interface display so corrective action can be taken.

One embodiment is a method for verifying compatibility between a document to be accessed via a server and capabilities of the server to support features of the document. The method involves receiving a document, scanning the document for features, comparing the feature to the capabilities of the server, and determining whether the capabilities of the server support the features of the document. The method may also involve generating an incompatibility notice for features of the document when a feature is not supported by the capabilities of the server, detecting a revision to the capabilities of the server, and revising a comparison list of server limitations to reflect the revision.

Another embodiment is a computer program product including a computer-readable medium having control logic stored therein for causing a computer to verify compatibility between a document to be accessed via a server and capabilities of the server to support a feature of the document. The control logic includes computer-readable program code for causing the computer to receive a document, scan the document for features, compare the features to the capabilities of the server, determine whether the capabilities of the server support the features of the document; and generate an incompatibility notice for the feature of the document when the feature is not supported by the capabilities of the server.

Still another embodiment is a computer-implemented system for verifying compatibility between a document authored in a client application to be accessed via a server and capabilities of the server to support features of the document. The system includes the server operative to receive a document, scan the document for features, compare the features to the capabilities of the server, and determine whether the capabilities of the server support the feature of the document. The server is also operative to generate an incompatibility notice for a feature of the document when the feature is not supported by the capabilities of the server.

The system may also include a client computer operative to execute a client application and send the document to the server. The server may also be operative to generate an incompatibility message describing incompatibilities between features of the document and the capabilities of the server, generate a severity of each incompatibility, and forward the incompatibility message and the severities to the client computer for display via a user interface module of the client application. The document may be a document authored via the client application or a programmatically generated document.

The invention may be implemented utilizing a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
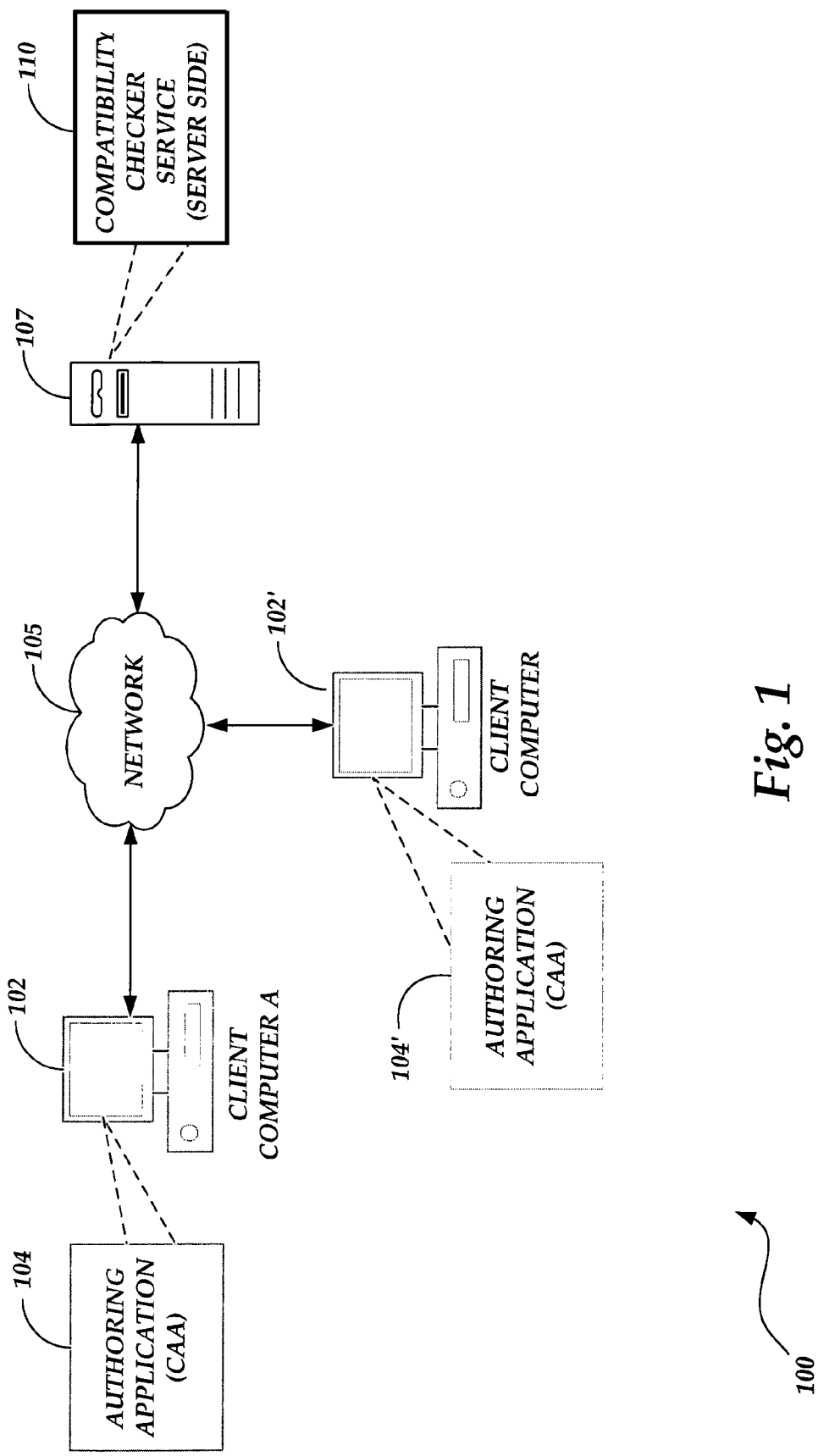
FIG. 1 is a block diagram illustrating client computing apparatuses, a server and a network architecture that provide an illustrative operating environment for illustrative embodiments of the present invention.

Referring now to the drawings, in which like numerals represent like elements, various aspects of the present invention will be described. In particular, FIGS. 1-3 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a block diagram showing client computing apparatuses 102 and 102', a server 107, and a network architecture that provide an illustrative operating environment 100 for illustrative embodiments of the present invention will be described. The operating environment 100 includes the computing apparatuses 102 and 102', where each computing apparatus executes a client authoring application (CAA) 104 or 104', such as EXCEL from MICROSOFT CORPORATION. The operating environment 100 also includes the server 107 that adheres to a number of Internet and/or intranet protocol standards in communicating with the computing apparatuses 102 and 102' via the network 105, for example the Internet or an intranet network.

The server 107 includes a compatibility checker service (CCS) 110 operative to verify compatibility between a document to be published for access via the server 107 and capabilities of the server 107 to support a feature of the document according to an illustrative embodiment of the invention. Additional details regarding verifying compatibility will be described below with respect to FIGS. 2-8.

Figure 2:
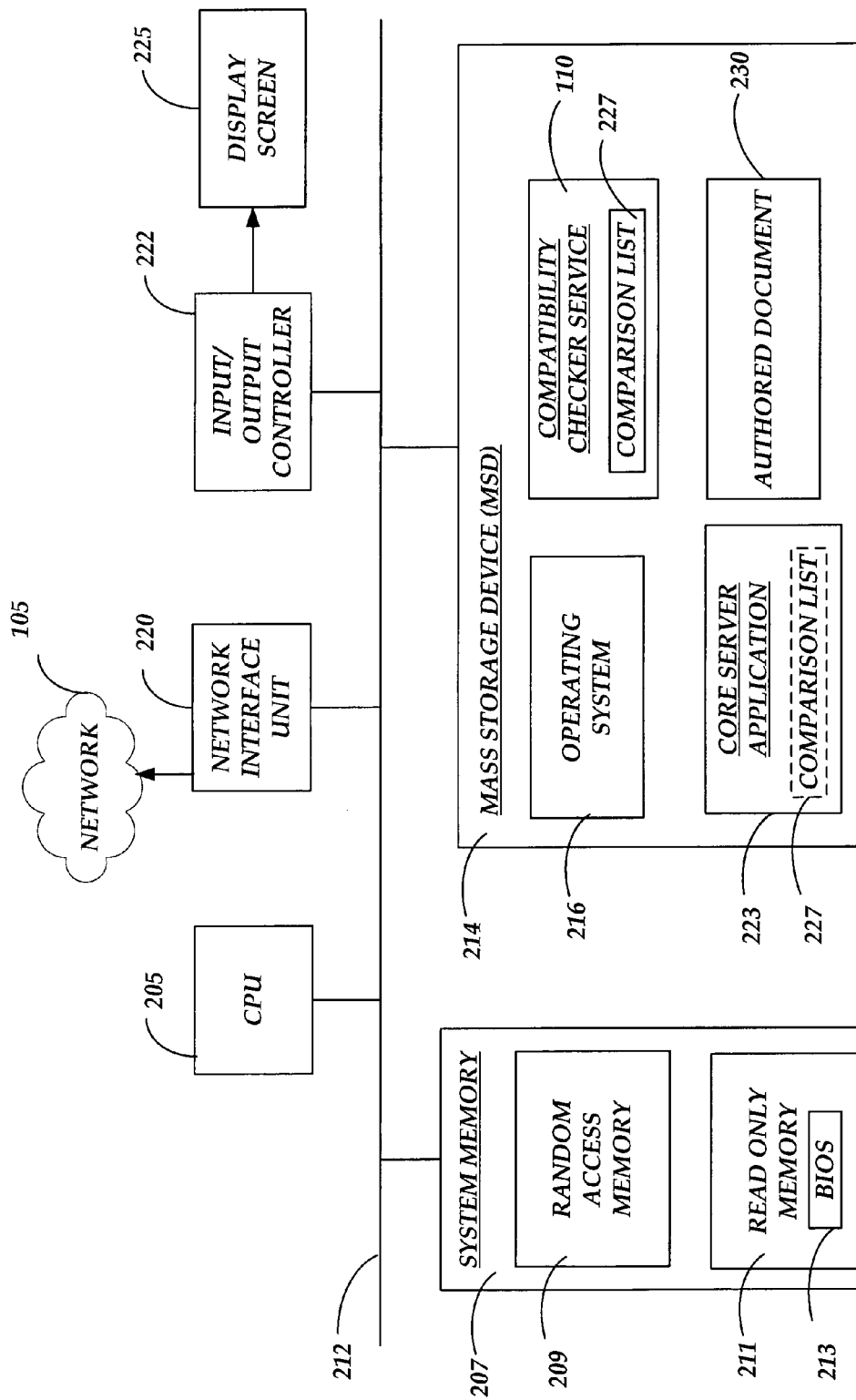
FIG. 2 is a computing system architecture illustrating a server computing apparatus utilized in and provided by various illustrative embodiments of the invention.

Referring now to FIG. 2, a computing system architecture illustrating the server 107 utilized in various illustrative embodiments of the invention will be described. The computer architecture shown in FIG. 2 illustrates the server 107, including a central processing unit 205 ("CPU"), a system memory 207, including a random access memory 209 ("RAM") and a read-only memory ("ROM") 211, and a system bus 212 that couples the memory to the CPU 205. A basic input/output system 213 (BIOS) containing the basic routines that help to transfer information between elements within the computer, such as during startup, is stored in the ROM 211. The server 107 further includes a mass storage device 214 for storing an operating system 216, application programs, and other program modules, which will be described in greater detail below.

The mass storage device 214 is connected to the CPU 205 through a mass storage controller (not shown) connected to the bus 212. The mass storage device 214 and its associated computer-readable media provide non-volatile storage for the server 107. Although the description of computer-readable media contained herein refers to a mass storage device, such as a hard disk or CD-ROM drive, it should be appreciated by those skilled in the art that computer-readable media can be any available media that can be accessed by the server 107.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS"), or other optical storage, magnetic cassettes, magnetic tape, magnetic disk storage or other magnetic storage devices, or any other medium which can be used to store the desired information and which can be accessed by the server 107.

According to various embodiments of the invention, the server 107 may operate in a networked environment using logical connections to remote computers through the network 105, such as the Internet or intranet. The server 107 may connect to the network 105 through a network interface unit 220 connected to the bus 212. It should be appreciated that the network interface unit 220 may also be utilized to connect to other types of networks and remote computer systems. The server 107 may also include an input/output controller 222 for receiving and processing input from a number of other devices, including a keyboard, mouse, or electronic stylus (not shown). Similarly, an input/output controller 222 may provide output to a display screen 225, a printer, or other type of output device.

As mentioned briefly above, a number of program modules and data files may be stored in the mass storage device 214 and RAM 209 of the server 107, including an operating system 216 suitable for controlling the operation of a networked personal computer, such as the WINDOWS XP operating system from MICROSOFT CORPORATION of Redmond, Wash. The mass storage device 214 and RAM 209 may also store one or more other program modules. In particular, the mass storage device 214 and the RAM 209 may store the CCS 110. The CCS 110 is operative to verifying compatibility between an authored document 230 to be published for access via the server 107 and capabilities of the server 107 to support a feature of the document 230. The CCS 110 also includes a comparison list 227 for use in identifying and comparing limitations of the server to features of the document 230. The CCS 110 has access to the comparison list 227, which is a dynamic list that is updated or revised by the CCS 110 when a revision to the capability of the server 107 is detected.

The mass storage device 214 and RAM 209 may also store the core server application 223 that provides core server functionality for rendering and/or supporting features of the authored document 230. Alternatively, the comparison list may be part of the core server application 223. The core server application 223 is operative to load the document 230 and make the appropriate calculations for and render the document 230. The core server application 223 also operates utilizing different protocols that are necessary to communicate with the client apparatuses 102 and 102' via the network 105. Thus, the core server application 223 may prompt the CCS 110 to verify compatibility on the server 107. The core server application 223 then receives results of the compatibility check and executes to send that information to the client authoring application 104 for display to an end-user so changes can be made to the document 230 before publishing.

Examples of document features with which the CCS 110 verifies compatibility include, but are not limited to, whether there are parts of the document 230 that are not capable of being rendered in the web browser when the server 107 is operative to render the document 230 in a web browser, document protection, art, interactive pivot tables, and/or refreshable query tables. Other example features include special calculations that are performed in the document 230 when the client authoring application performs the calculation one way and the core server application 223 performs it a different way and/or if the server 107 cannot perform a calculation at all.

Figure 3:
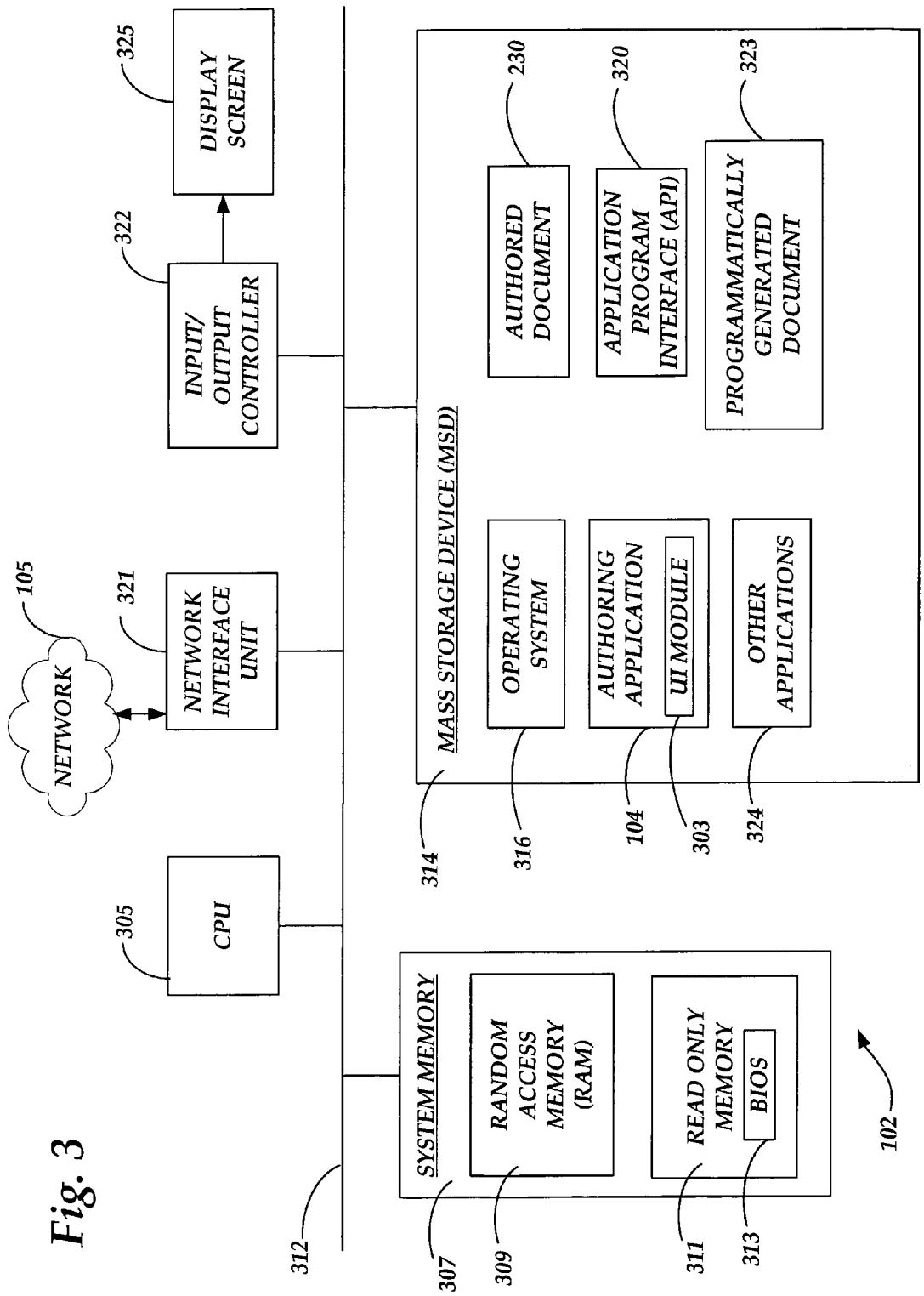
FIG. 3 is a computing system architecture illustrating a client computing apparatus utilized in and provided by various illustrative embodiments of the invention.

Referring now to FIG. 3, a computing system architecture illustrating the client computing apparatus 102' utilized in various illustrative embodiments of the invention will be described. The computer architecture shown in FIG. 3 illustrates the computing apparatus 102', such as a desktop, laptop, or handheld computing apparatus, including a central processing unit 305 ("CPU"), a system memory 307, including a random access memory 309 ("RAM") and a read-only memory ("ROM") 311, and a system bus 312 that couples the memory to the CPU 305. A basic input/output system 313 (BIOS) containing the basic routines that help to transfer information between elements within the computer, such as during startup, is stored in the ROM 311. The computing apparatus 102' further includes a mass storage device 314 for storing an operating system 316, application programs, and other program modules, which will be described in greater detail below. The computer architecture shown in FIG. 3 is structured in a similar fashion to the computer architecture described above in FIG. 2.

According to various embodiments of the invention, the computing apparatus 102' may operate in a networked environment using logical connections to remote computers through the network 105, such as the Internet or intranet. The computing apparatus 102' may connect to the network 105 through a network interface unit 321 connected to the bus 312. It should be appreciated that the network interface unit 321 may also be utilized to connect to other types of networks and remote computer systems. The computing apparatus 102' may also include an input/output controller 322 for receiving and processing input from a number of other devices, including a keyboard, mouse, or electronic stylus (not shown). Similarly, an input/output controller 322 may provide output to a display screen 325, a printer, or other type of output device.

As mentioned briefly above, a number of program modules and data files may be stored in the mass storage device 314 and RAM 309 of the computing apparatus 102', including an operating system 316 suitable for controlling the operation of a networked personal computer, such as the WINDOWS XP operating system from MICROSOFT CORPORATION of Redmond, Wash. The mass storage device 314 and RAM 309 may also store one or more program modules. In particular, the mass storage device 314 and the RAM 309 may store the CAA 104. The CAA 104 includes a user interface (UI) module 303 operative to display incompatibility messages comprising the results of the compatibility check executed by the CCS 110 on the document 230.

The mass storage device 314 may also include a programmatically generated document 323, for example a developer solution that may be forwarded to the server 107 for a compatibility check using an application program interface (API) 320. For instance, a caller may call the API 320 and the document 323 may be forwarded from the caller through the API 320. Also, compatibility check results may be received at the API 320 and passed back to the caller when the results are forwarded from the CCS 110.

According to one embodiment of the invention, the CAA 104 and other application programs 324 may comprise the OFFICE suite of application programs from MICROSOFT CORPORATION including the WORD, EXCEL, and POWERPOINT application programs. The other application programs 324 may also include a web browser application, such as INTERNET EXPLORER from MICROSOFT CORPORATION.

In various embodiments of the invention, the authored document 230 and the programmatically generated document 323 may be formatted according to extensible markup language ("XML"). As is understood by those skilled in the art, XML is a standard format for communicating data. In the XML data format, a schema is used to provide XML data with a set of grammatical and data type rules governing the types and structure of data that may be communicated. Additional details regarding verifying compatibility will be described below with respect to FIGS. 4-8.

Figure 4:
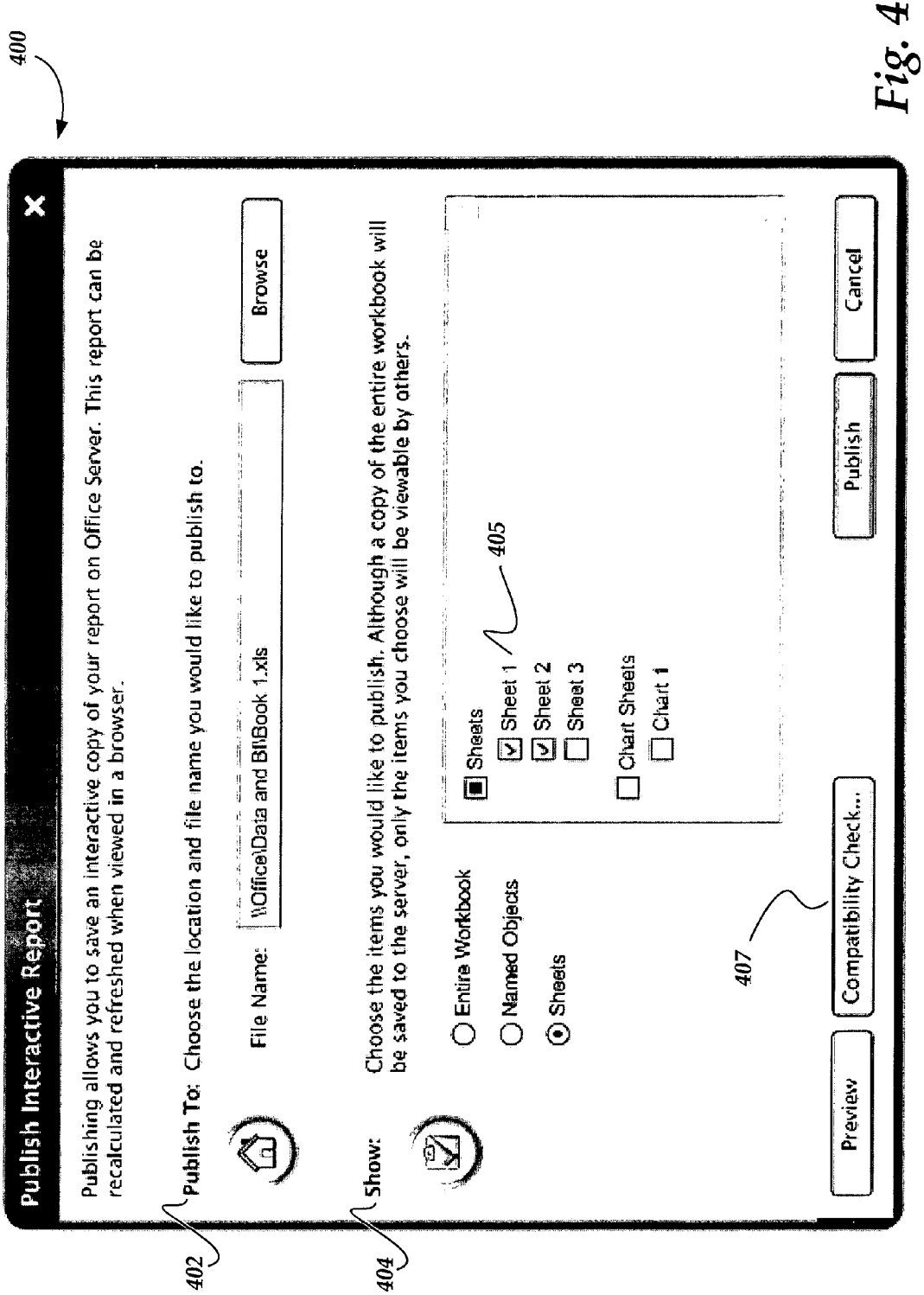
FIG. 4 is a computer screen display illustrating a user interface displaying a publishing interactive report illustrating an option to verify or check compatibility according to an illustrative embodiment of the present invention.

FIG. 4 is a computer screen display illustrating a user interface 400 displaying a publishing interactive report illustrating an option 407 to verify or check compatibility according to an illustrative embodiment of the present invention. The user interface 400 may be displayed via the display screen 325 of the client computing apparatuses 102 and 102'. The user interface 400 prompts the user to select a location 402 at which to publish a document, for instance the document. Choosing the location 402 may imply choosing a server. The chosen server is used to calculate, render, and/or process documents stored at the selected location.

The user interface 400 also provides a show selection 404 that prompts a user to select parts of a document for shared publishing, such as a sheet selection 405 from an EXCEL workbook. The user may select the option 407 to initiate the compatibility service 110. In the alternative the compatibility checker service or application may be launched automatically upon publishing a document.

Figure 5:
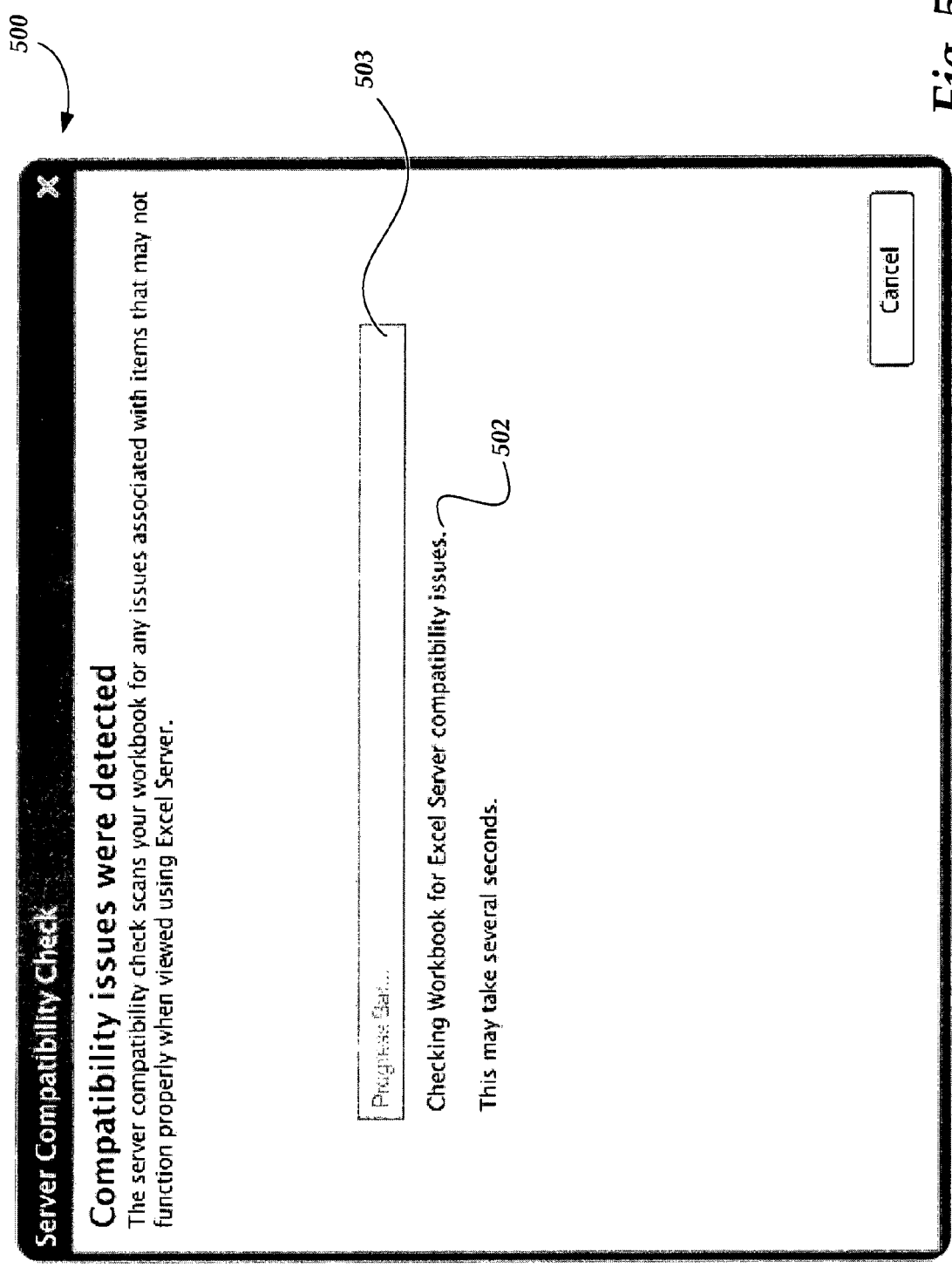
FIG. 5 is a computer screen display illustrating a user interface displaying progress and status of a compatibility check according to an illustrative embodiment of the present invention.

FIG. 5 is a computer screen display illustrating a user interface 500 displaying progress and status of a compatibility check according to an illustrative embodiment of the present invention. The user interface 500 may also be displayed to a user via the display screen 325. A progress bar 503 updates the user on the progress of the compatibility check and the status text 502 updates the user on the status.

Figure 6:
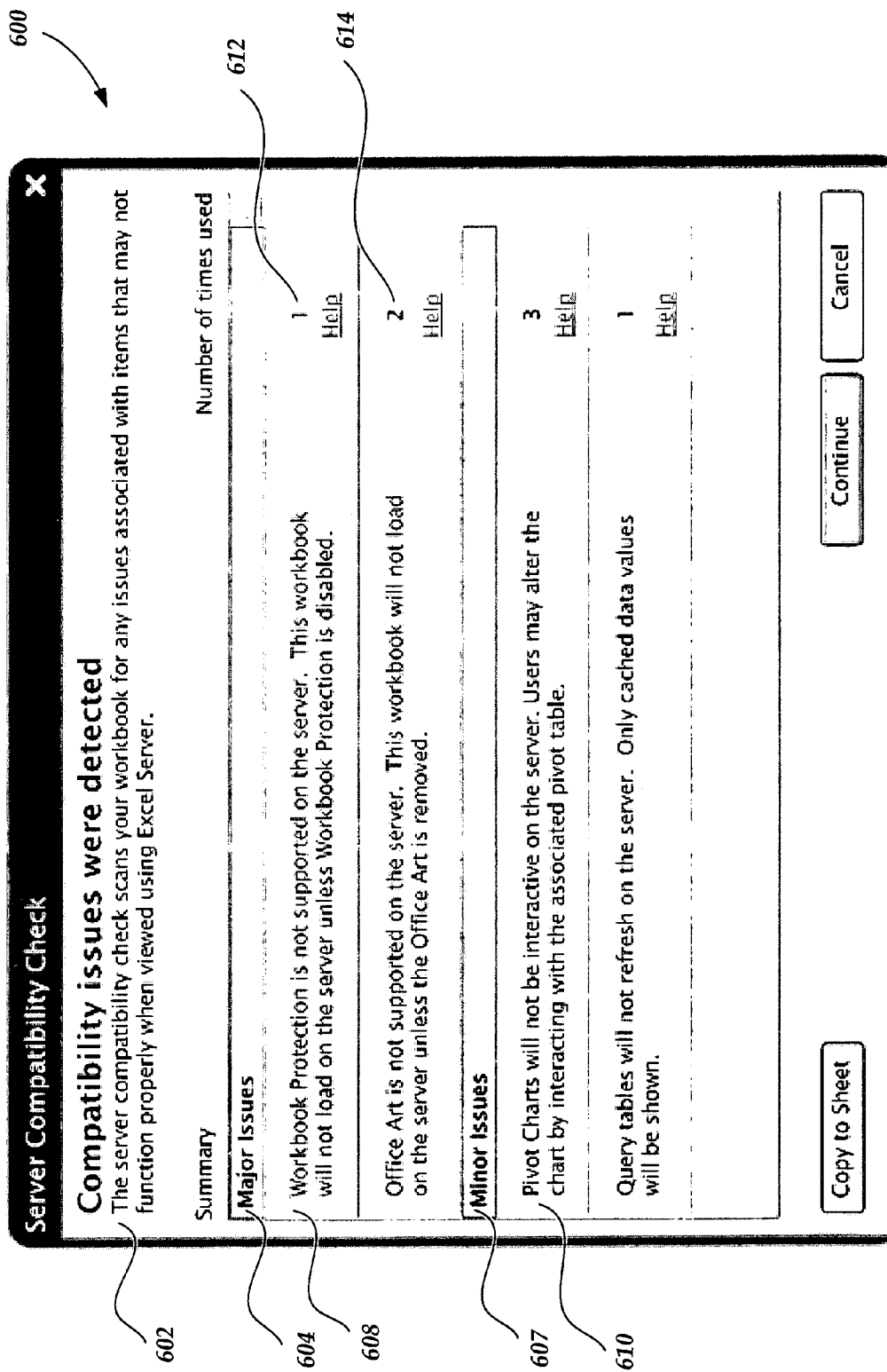
FIG. 6 is a computer screen display illustrating a user interface displaying an incompatibility message showing results of a compatibility check according to an illustrative embodiment of the present invention.

FIG. 6 is a computer screen display illustrating a user interface 600 displaying an incompatibility message showing results of a compatibility check according to an illustrative embodiment of the present invention. The user interface 600 may be displayed to a user via the display screen 325 utilizing the UI module 303. The user interface 600 displays status text 602 for notifying the user whether compatibility issues were detected. The user interface 600 also displays severity of the issues, such as major issues 604 and minor issues 607. Additionally, the user interface 600 displays incompatibility text 608 and 610 that may include solutions to the incompatibility. Still further, the user interface 600 provides a number of times 612 the displayed incompatibility has been used in the document and a link 614 to additional help information.

Figure 7:
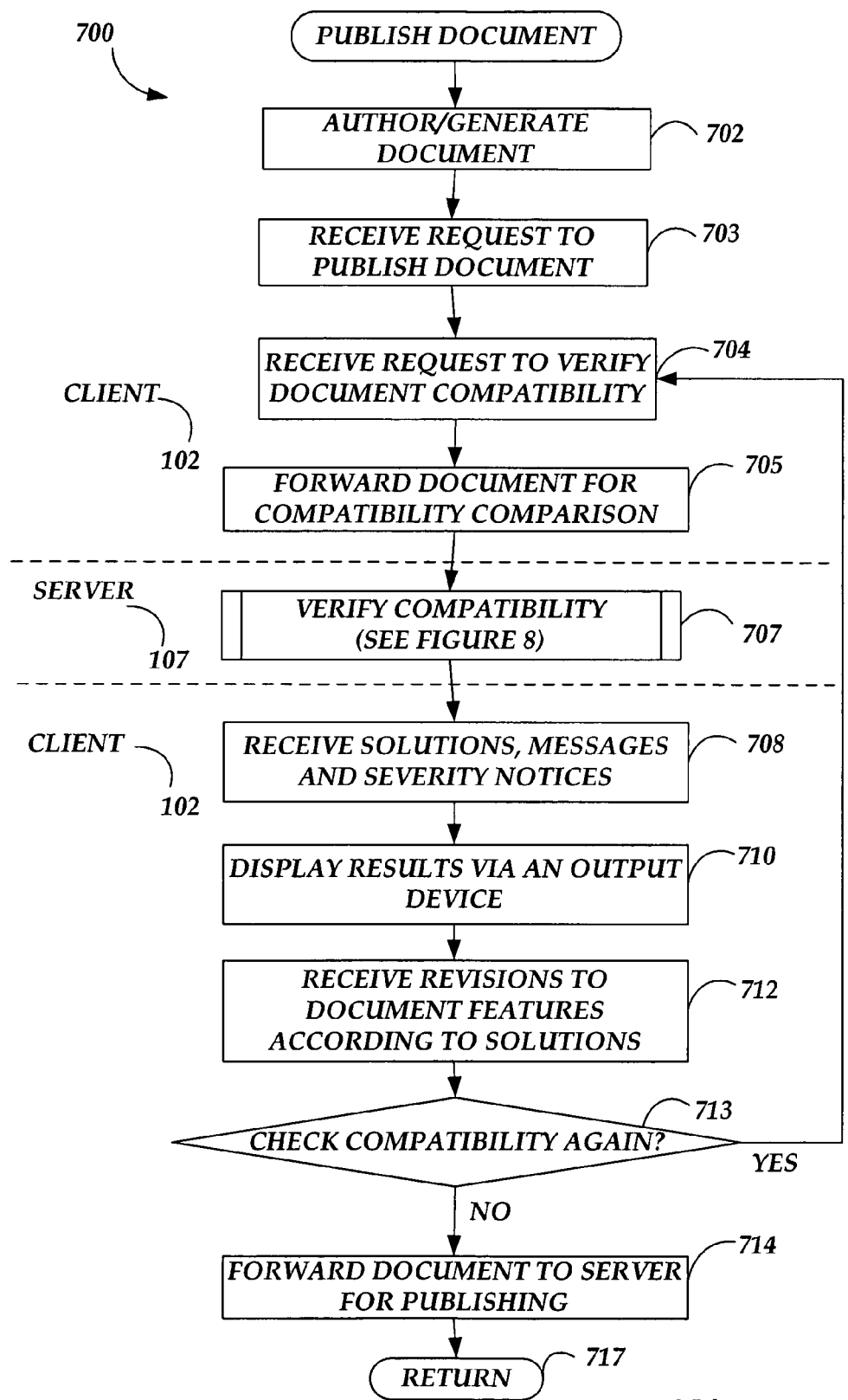
FIG. 7 is an operational flow diagram illustrating operations performed in publishing a document for access by others via a server according to an illustrative embodiment of the present invention.
Figure 8:
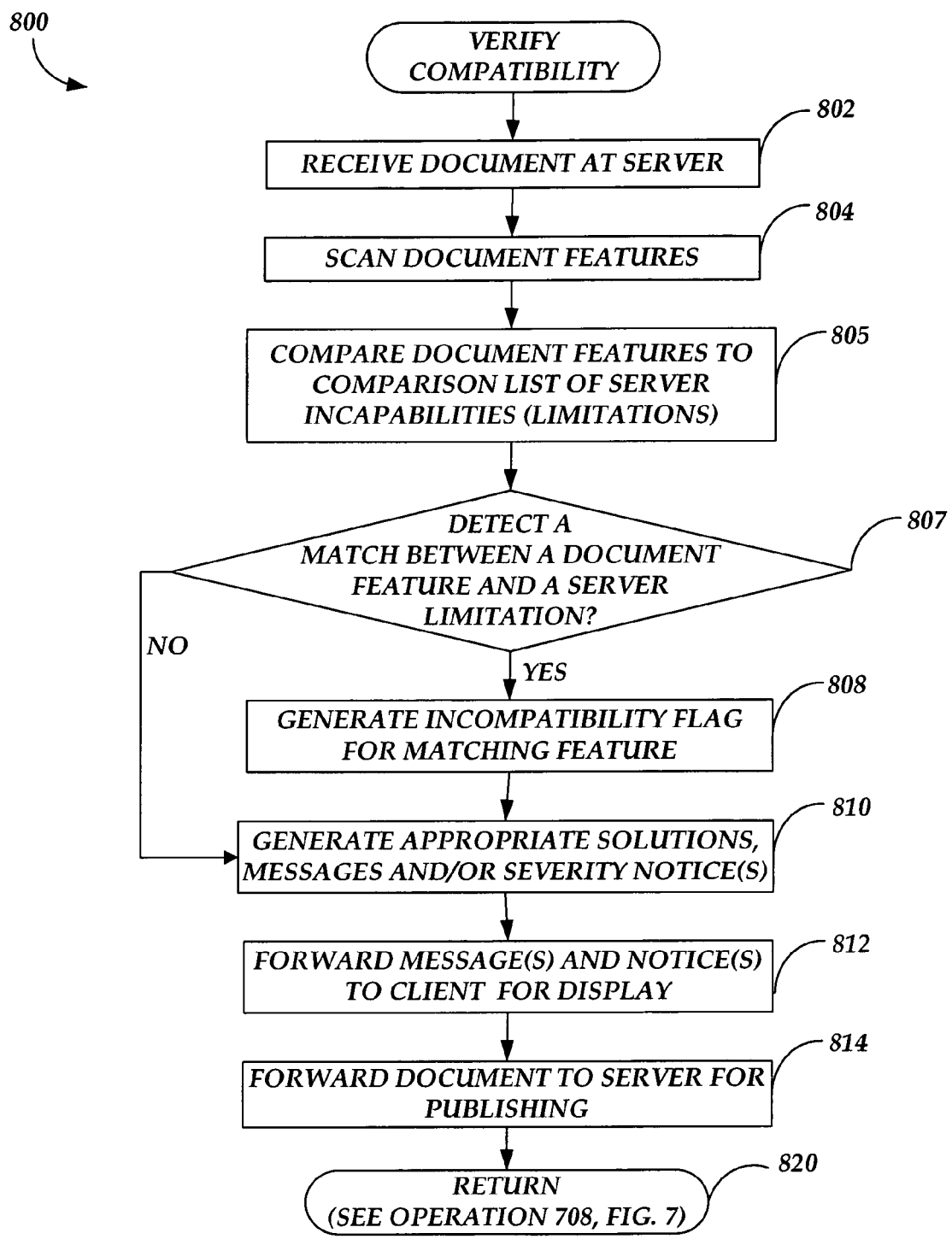
FIG. 8 is an operational flow diagram illustrating operations performed in verifying compatibility between a document to be accessed via a server and capabilities of the server to support features of the document according to an illustrative embodiment of the present invention.

FIGS. 7-8 are illustrative routines or operational flows performed in configuring electronic messaging applications according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 7-8, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 7 is an operational flow diagram 700 illustrating operations performed in publishing a document for access by others via a server according to an illustrative embodiment of the present invention. The operational flow 700 begins at operation 702 where a document is authored, for instance by the client application 104 executing on the client computing apparatus 102, or generated, for instance as a programmatic solution.

Next, at operation 703 the client application receives a request to publish the document to server, for instance to the server 107. Then at operation 704, the client application receives a request to verify or check compatibility between the document features and the server capability. This request may be received via the user interface 400 described above. Alternatively, a compatibility check may be automatically initiated upon receiving a request for publishing the document. Next at operation 705, the client application or an API, such as the API 320, forwards the document to the server for a compatibility comparison. It should be appreciated that a compatibility check may be requested outside the context of publishing and may be requested as the document is being drafted.

Next, the operational flow 700 continues from operation 705 to operation 707, where the CCS 110 verifies compatibility between the document to be published for access via the server and capabilities of the server to support features of the document. Additional details regarding operation 707 will be described below with respect to FIG. 8.

Next, at operation 708, the client application receives results of the compatibility check comprising solutions to the incompatibilities, incompatibility messages, and severity notices. Results of a compatibility check are illustrated with respect to FIG. 6 described above.

At operation 710, the UI module 303 of the client application 104 displays the results via a user interface to a user of the client application via the display screen 325. Then at operation 712, the client application 104 receives revisions to document features based on solutions received at operation 710. Next, at detect operation 713 a determination is made as to whether the user chooses to check compatibility between the document and the server again. When the user chooses to check compatibility again, the operational flow 700 continues from detect operation 713 to operation 704 described above. When the user chooses not to check compatibility again, the operational flow continues from detect operation 713 to operation 714.

At operation 714, the client application forwards the document 230 to the server 107 for publishing. The operational flow 700 then returns control to other operations at return operation 717.

FIG. 8 is an operational flow diagram 800 illustrating operations performed in verifying compatibility between a document to be published for access via a server and capabilities of the server to support features of the document according to an illustrative embodiment of the present invention. The operational flow 800 begins at operation 802 where the CCS 110 receives the document forwarded at operation 705 of FIG. 7.

Next, at operation 804, the CCS 110 scans or iterates through the document to identify features of the document for comparison. Then the operational flow 800 continues to operation 807 where the CCS 110 compares the features of the document to the capabilities of the server. This may be accomplished by comparing the features to a comparison list 227 listing the limitations of the server 107.

Then at detect operation 808, the CCS 110 determines whether the capabilities of the server support the features of the document. This may be accomplished by detecting whether a match exist between a feature of the document and at least one of the server limitations. When a match is detected, the operational flow 800 continues to operation 810 where the CCS 110 generates an incompatibility notice for the feature of the document when the feature is not supported by the capabilities of the server. This may be accomplished by flagging the detected incompatibility.

Then operational flow 800 then continues from operation 810 to operation 812 described below. When at detect operation 808, the CCS 110 does not detect a match between the comparison list 227 and a document feature, the operational flow 800 continues from detect operation 808 to operation 812. At operation 812, appropriate messages, solutions, and/or severity notices are generated. When matches are not detected an appropriate message would state that no incompatibilities were detected.

The operational flow 800 then continues to operation 814 where the CCS 110 forwards the messages and notices generated at operation 812 to the client application 104 for display. Then operational flow 800 then continues from operation 812 to return control to other operations at return operation 820.

Figure 9:
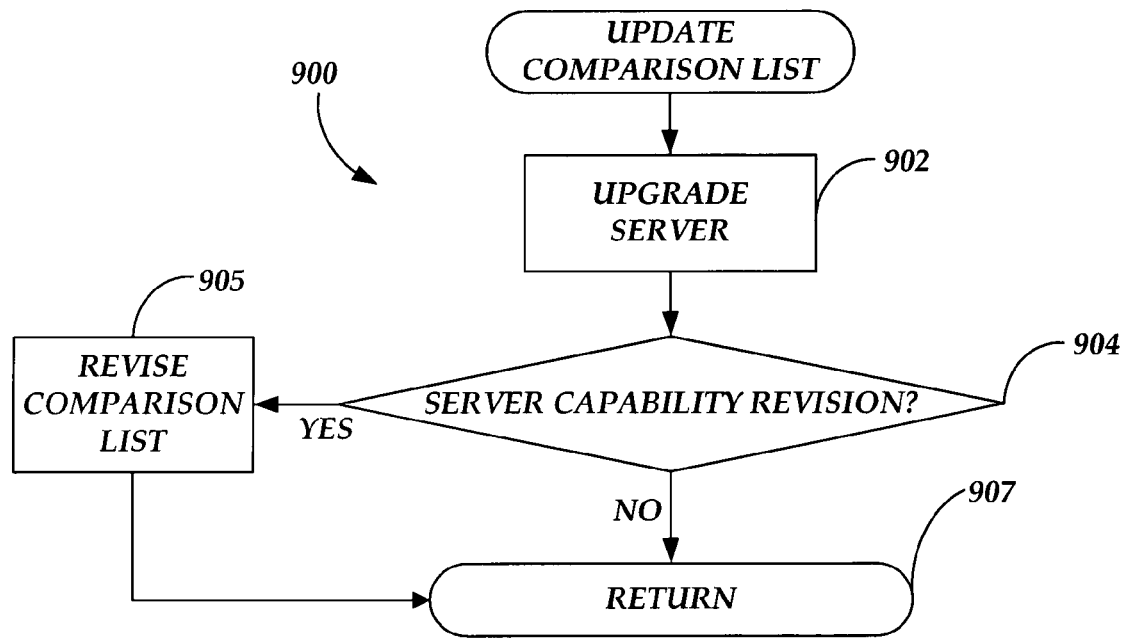
FIG. 9 is an operational flow diagram illustrating operations performed in updating a comparison list of the server according to an illustrative embodiment of the present invention.

FIG. 9 is an operational flow diagram illustrating operations performed in updating a comparison list of the server according to an illustrative embodiment of the present invention. The operational flow 900 begins at operation 902 where the server 107 receives an upgrade.

Next, at operation 904, the CCS 110 determines whether a revision has been made to the capabilities of the server 107 in supporting document features. When no revision is detected, the operational flow 900 continues to return operation 907 described below. When a revision is detected, the operational flow 900 continues from detect operation 904 to operation 905.

At operation 905, the CCS 110 revises the comparison list 227 to reflect the revision to the server 107 capabilities. Then operational flow 900 then continues from operation 905 to return control to other operations at return operation 907.

Based on the foregoing, it should be appreciated that the various embodiments of the invention include methods, systems, and computer-readable mediums for verifying compatibility between a document to be published for access via a server and capabilities of the server to support a feature of the document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for verifying compatibility between a document to be accessed via a server and capabilities of the server to support a feature of the document, the method comprising:
   receiving a document;
   scanning the document for a feature;
   comparing the feature to the capabilities of the server;
   determining whether the capabilities of the server support the feature of the document, wherein determining whether the capabilities of the server support the feature of the document comprises determining at least one of whether a calculation performed in the document is performed in a different way on the server and whether a calculation performed in the document cannot be performed on the server, wherein the document comprises a spreadsheet application program workbook;
   generating an incompatibility message for the feature of the document when the feature is not supported by the capabilities of the server, wherein the incompatibility message is generated in response to a request for verifying compatibility as the document is being drafted, wherein the incompatibility message includes at least two types of compatibility issues based on severity, the at least two types of issues comprising a separate listing of major issues for features in the document and a separate listing of minor issues for features in the document, wherein the major issues comprise the inability of the spreadsheet application program workbook to load on the server due to an unsupported feature of the spreadsheet application workbook on the server, and wherein the minor issues comprise the ability of the spreadsheet application program workbook to load on the server with reduced functionality due to an unsupported feature of the spreadsheet application workbook on the server, wherein minor issues include a lack of interactivity for a pivot chart in the document on the server;
   providing to a client application in a graphical user interface, at least one numerical value corresponding to a number of times that the unsupported feature in the separate listing of major issues in the incompatibility message has been used in the spreadsheet application workbook, wherein the graphical user interface comprises at least one solution for resolving an issue associated with the unsupported feature in the separate listing of major issues; and
   providing to the client application in the graphical user interface, at least one numerical value corresponding to a number of times that the unsupported feature in the separate listing of minor issues in the incompatibility message has been used in the spreadsheet application program workbook, wherein the graphical user interface further comprises at least one solution for resolving an issue associated with the unsupported feature in the listing of minor issues, wherein the spreadsheet application workbook is authored via the client application.

2. The method of claim 1, wherein receiving the document comprises receiving the document at one of the server and a location to which the server has access to the document in response to a request to publish the document.

3. The method of claim 1, wherein comparing the feature to the capabilities of the server comprises comparing the feature to a comparison list of server limitations and wherein determining whether the capabilities of the server support the feature of the document comprises detecting whether a match exists between the feature of the document and at least one of the server limitations.

4. The method of claim 3, wherein generating the incompatibility message for the feature of the document when the feature is not supported by the capabilities of the server comprises in response to detecting the match between the feature and the at least one server limitation, flagging the feature as an incompatible feature for display via the user interface.

5. The method of claim 2, further comprising:
   detecting a revision to the capabilities of the server; and
   revising the comparison list of server limitations to reflect the revision.

6. The method of claim 1, wherein receiving the document comprises receiving the document via an application program interface executing on a client computer operative to send the document and receive the incompatibility message.

7. A computer program product comprising a computer-readable medium having control logic stored therein for causing a computer to verify compatibility between a document to be accessed via a server and capabilities of the server to support a feature of the document, the control logic comprising computer-readable program code for causing the computer to:
   receive a document;
   scan the document for a feature;
   compare the feature to the capabilities of the server;
   determine whether the capabilities of the server support the feature of the document, wherein determining whether the capabilities of the server support the feature of the document comprises determining at least one of whether a calculation performed in the document is performed in a different way on the server and whether a calculation performed in the document cannot be performed on the server, wherein the document comprises a spreadsheet application program workbook;
   generate an incompatibility message for the feature of the document when the feature is not supported by the capabilities of the server, wherein the incompatibility message is generated in response to a request for verifying compatibility as the document is being drafted, wherein the incompatibility message includes at least two types of compatibility issues based on severity, the at least two types of issues comprising a separate listing of major issues for features in the document and a separate listing of minor issues for features in the document, wherein the major issues comprise the inability of the spreadsheet application program workbook to load on the server due to an unsupported feature of the spreadsheet application workbook on the server, and wherein the minor issues comprise the ability of the spreadsheet application program workbook to load on the server with reduced functionality due to an unsupported feature of the spreadsheet application workbook on the server, wherein the minor issues include a lack of interactivity for a pivot chart in the document on the server;

provide to a client application in a graphical user interface, at least one numerical value corresponding to a number of times that the unsupported feature in the separate listing of major issues in the incompatibility message has been used in the spreadsheet application workbook, wherein the graphical user interface comprises at least one solution for resolving an issue associated with the unsupported feature in the separate listing of major issues; and provide to the client application in the graphical user interface, at least one numerical value corresponding to a number of times that the unsupported feature in the separate listing of minor issues in the incompatibility message has been used in the spreadsheet application program workbook, wherein the graphical user interface further comprises at least one solution for resolving an issue associated with the unsupported feature in the listing of minor issues, wherein the spreadsheet application workbook is authored via the client application.

8. The computer program product of claim 7, wherein the computer-readable program code for causing the computer to compare the feature to the capabilities of the server comprises computer-readable program code for causing the computer to compare the feature to a comparison list of server limitations; and wherein the computer-readable program code for causing the computer to determine whether the capabilities of the server support the feature of the document comprises computer-readable program code for causing the computer to detect whether a match exists between the feature of the document and at least one of the server limitations.

9. The computer program product of claim 8, wherein the computer-readable program code for causing the computer to generate the incompatibility message for the feature of the document when the feature is not supported by the capabilities of the server comprises computer-readable program code for causing the computer to flag the feature as an incompatible feature for display via the user interface in response to detecting the match between the feature and the at least one server limitation.

10. The computer program product of claim 7, wherein the computer-readable program code for causing the computer to receive the document comprises computer-readable program code for causing the computer to receive the document one of at the server and at a location to which the server has access to the document in response to a request to publish the document.

11. A system for verifying compatibility between a document authored in a client application to be accessed via a server and capabilities of the server to support a feature of the document, the system comprising:

a first computer comprising the server operative to:
  receive a document, wherein the document is forwarded for a compatibility check through an application program interface (API), the API called by a client computing apparatus storing the document;
  scan the document for a feature;
  compare the feature to the capabilities of the server;
  determine whether the capabilities of the server support the feature of the document, wherein determining whether the capabilities of the server support the feature of the document comprises determining at least one of whether a calculation performed in the document is performed in a different way on the server and whether a calculation performed in the document cannot be performed on the server, wherein the document comprises a spreadsheet application program workbook;
  generate an incompatibility message for the feature of the document when the feature is not supported by the capabilities of the server, wherein the incompatibility message is generated in response to a request for verifying compatibility as the document is being drafted, wherein the incompatibility message includes at least two types of compatibility issues based on severity, the at least two types of issues comprising a separate listing of major issues for features in the document and a separate listing of minor issues for features in the document, wherein the major issues comprise the inability of the spreadsheet application program workbook to load on the server due to an unsupported feature of the spreadsheet application workbook on the server, and wherein the minor issues comprise the ability of the spreadsheet application program workbook to load on the server with reduced functionality due to an unsupported feature of the spreadsheet application workbook on the server, wherein the minor issues include a lack of interactivity for a pivot chart in the document on the server;
  provide to a client application in a graphical user interface, at least one numerical value corresponding to a number of times that the unsupported feature in the separate listing of major issues in the incompatibility message has been used in the spreadsheet application workbook, wherein the graphical user interface comprises at least one solution for resolving an issue associated with the unsupported feature in the separate listing of major issues; and
  provide to the client application in the graphical user interface, at least one numerical value corresponding to a number of times that the unsupported feature in the separate listing of minor issues in the incompatibility message has been used in the spreadsheet application program workbook, wherein the graphical user interface further comprises at least one solution for resolving an issue associated with the unsupported feature in the listing of minor issues, wherein the spreadsheet application workbook is authored via the client application.

12. The system of claim 11, wherein the first computer is further operative to scan the document in response to a request to publish the document;
  compare the feature to a comparison list of server limitations;
  update a user as to the progress of the comparison of the feature to the comparison list of server limitations via a progress bar in the user interface;

display status text in the user interface to update the user as to the status of the comparison of the feature to the comparison list of server limitations;

detect whether a match exists between the feature of the document and at least one of the server limitations; and flag the feature as an incompatible feature for display via the user interface in response to detecting the match between the feature and the at least one server limitation.

13. The system of claim 12, further comprising a second computer operative to execute the client application, receive the request to publish the document, and send the document to the server wherein the server is further operative to:

forward the incompatibility message and the severity to the second computer for display via a user interface module of the client application;

detect a revision to the capabilities of the server; and revise the comparison list of server limitations to reflect the revision.

* * * * *